Oct. 11, 1955   C. L. PETERSON   2,720,315
FILTER AND METHOD FOR USING SAME
Filed May 16, 1949   12 Sheets-Sheet 1
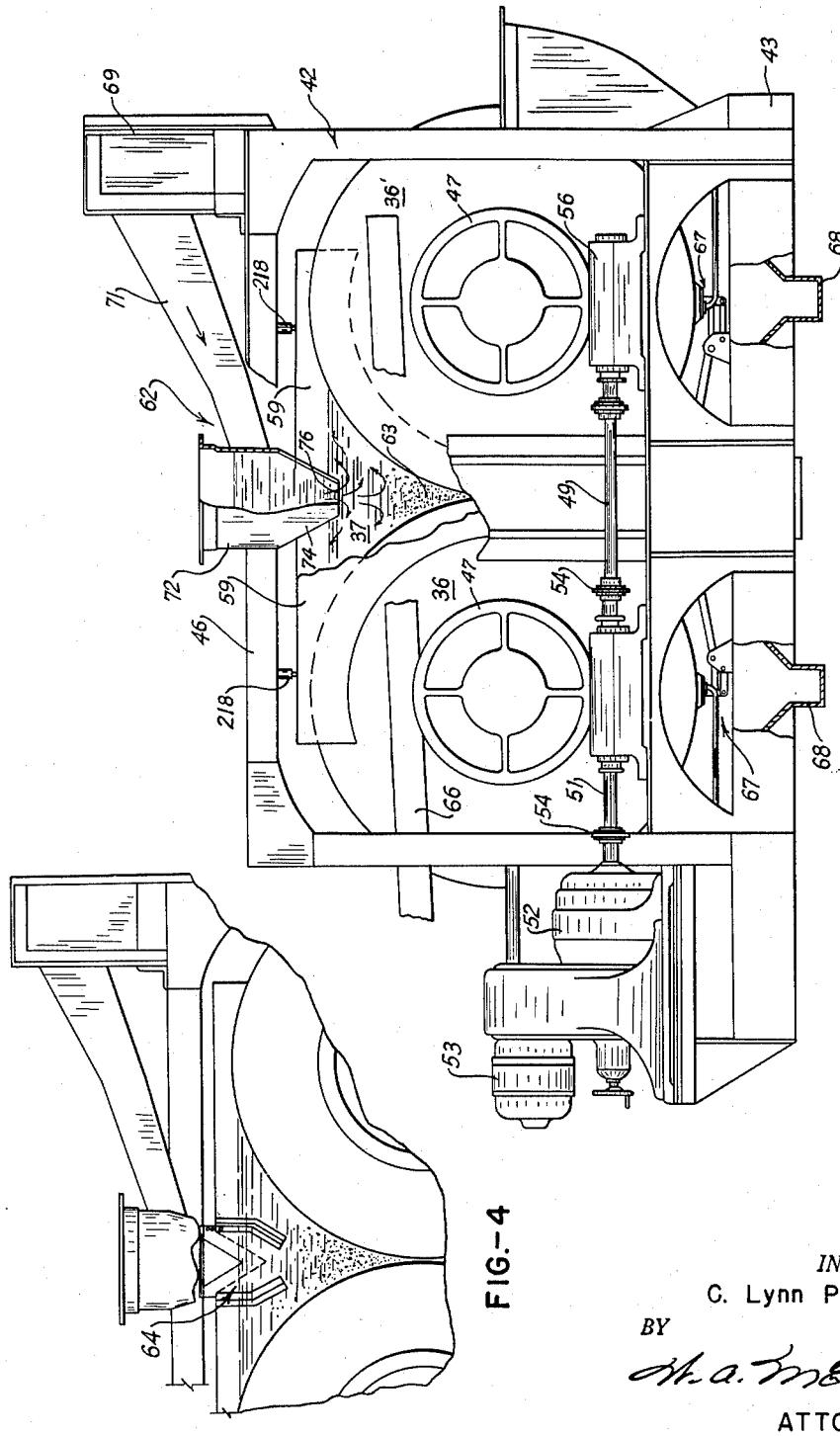
*INVENTOR.*
C. Lynn Peterson
BY
*M. A. McGrew*
ATTORNEY Oct. 11, 1955  C. L. PETERSON  2,720,315
FILTER AND METHOD FOR USING SAME
Filed May 16, 1949  12 Sheets-Sheet 2
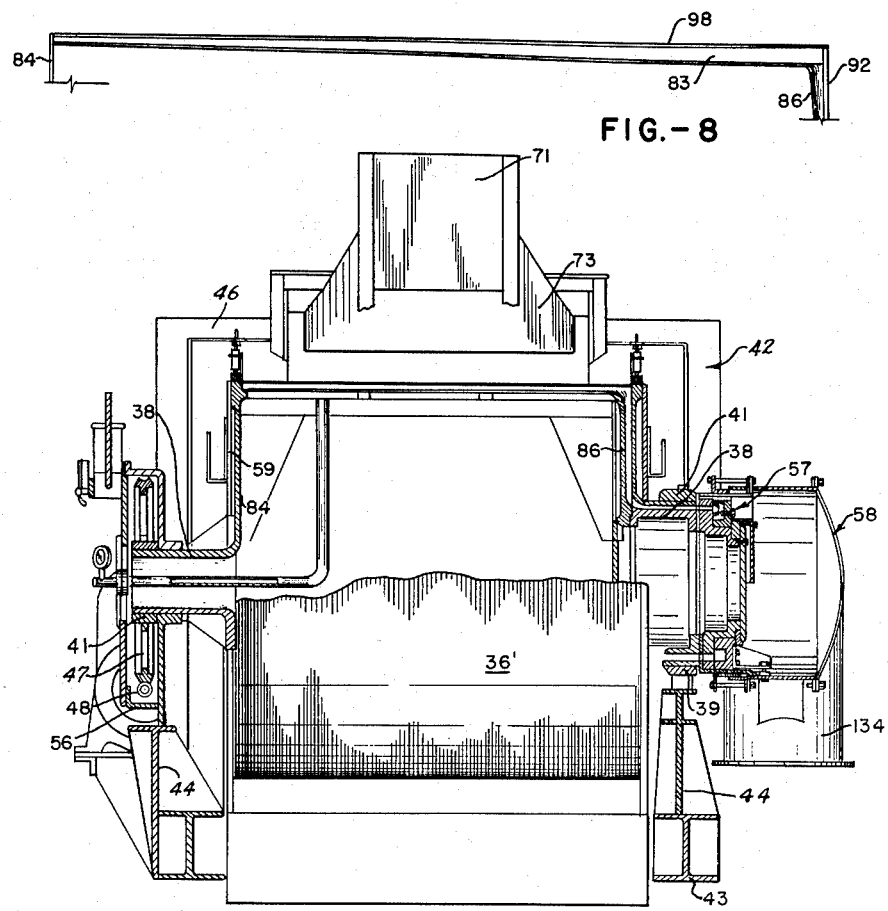
FIG.-8
FIG.-2
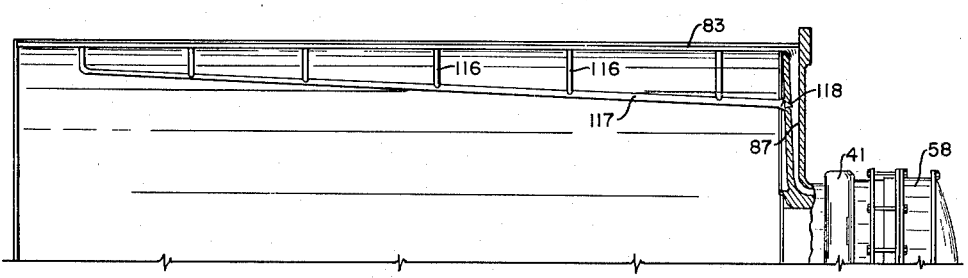
FIG.-9
INVENTOR.
C. Lynn Peterson
BY
ATTORNEY

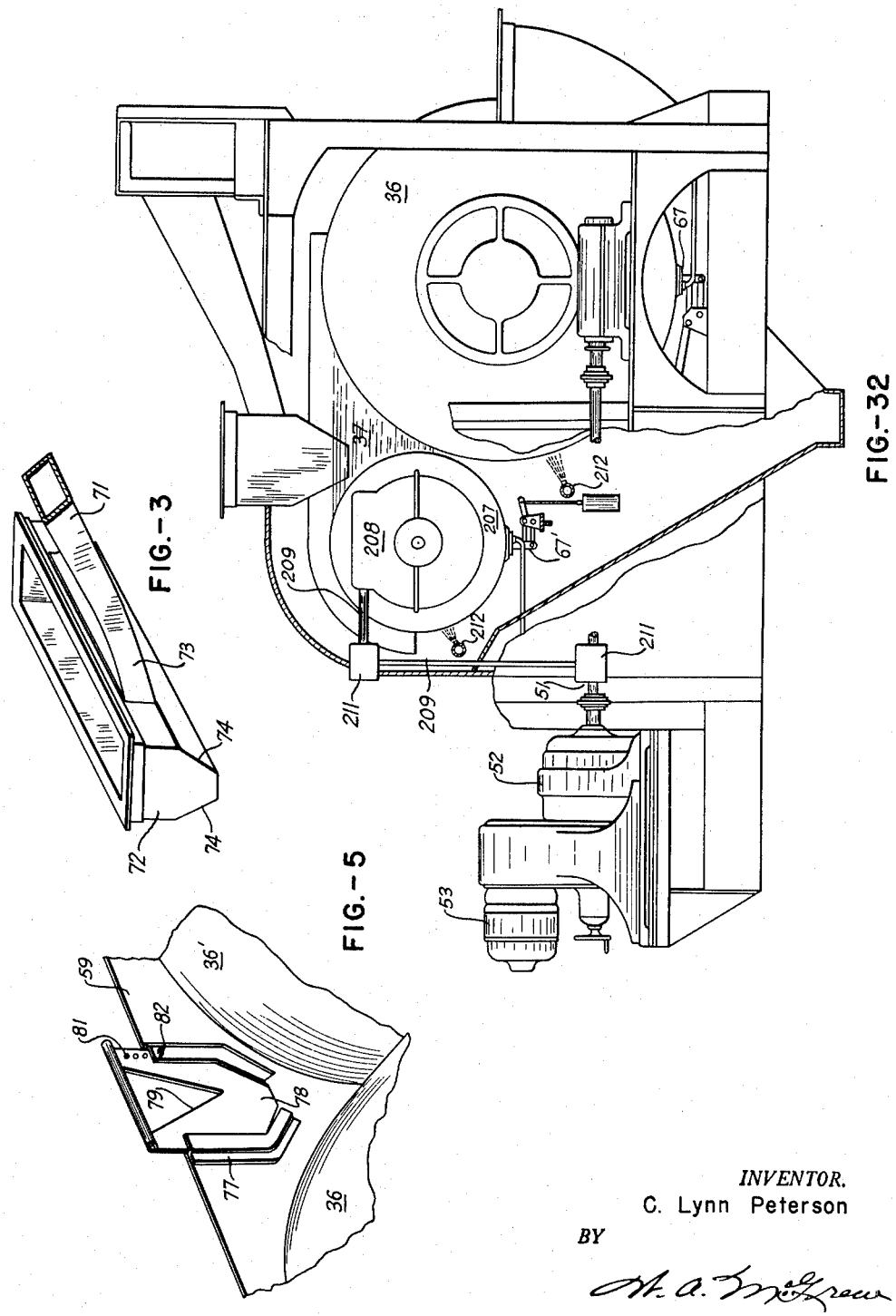

Oct. 11, 1955     C. L. PETERSON     2,720,315
FILTER AND METHOD FOR USING SAME
Filed May 16, 1949     12 Sheets-Sheet 4

INVENTOR.
C. Lynn Peterson
BY
ATTORNEY

Oct. 11, 1955

C. L. PETERSON 2,720,315

FILTER AND METHOD FOR USING SAME

Filed May 16, 1949

*INVENTOR.*
C. Lynn Peterson
BY
ATTORNEY

Oct. 11, 1955   C. L. PETERSON   2,720,315
FILTER AND METHOD FOR USING SAME
Filed May 16, 1949   12 Sheets-Sheet 6

INVENTOR.
C. Lynn Peterson
BY
ATTORNEY

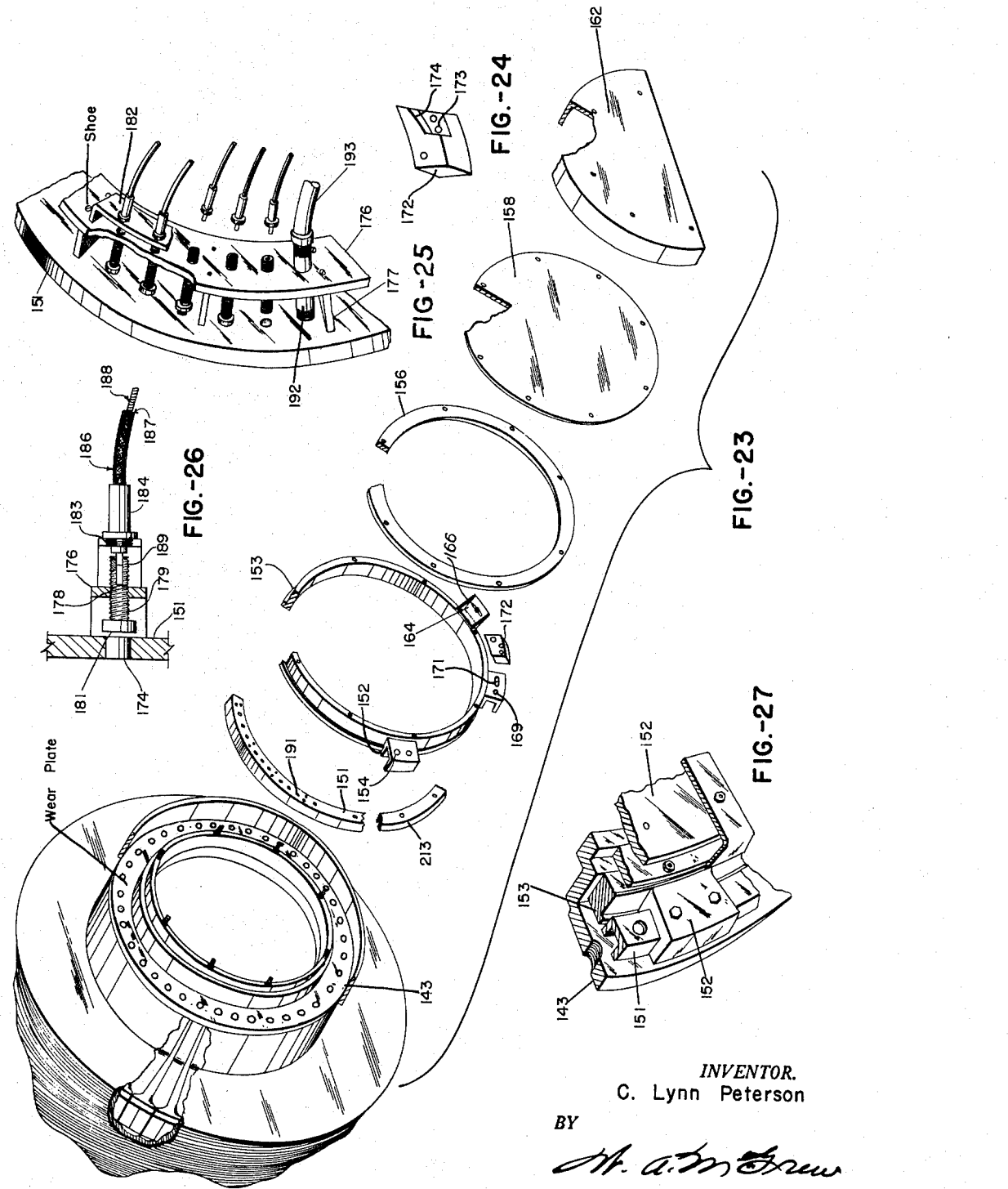

Oct. 11, 1955     C. L. PETERSON     2,720,315
FILTER AND METHOD FOR USING SAME
Filed May 16, 1949     12 Sheets-Sheet 9

*INVENTOR.*
C. Lynn Peterson
BY
ATTORNEY

Oct. 11, 1955  C. L. PETERSON  2,720,315
FILTER AND METHOD FOR USING SAME
Filed May 16, 1949  12 Sheets-Sheet 10
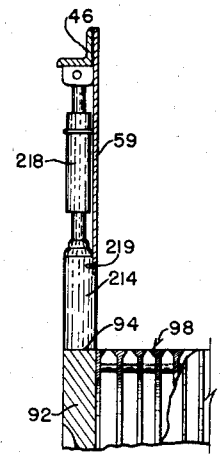
FIG.-33
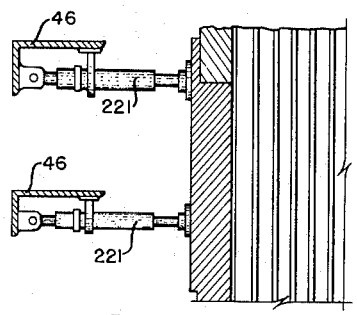
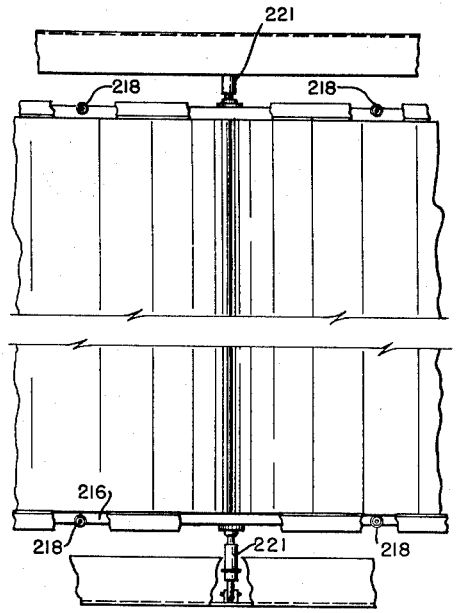
FIG.-34
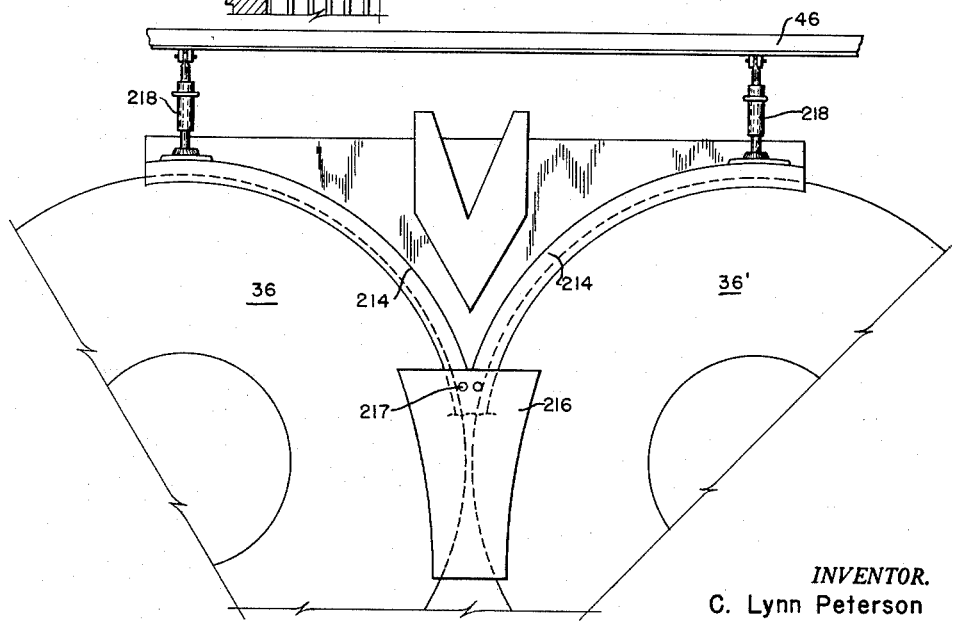
FIG.-35
INVENTOR.
C. Lynn Peterson
BY
ATTORNEY Oct. 11, 1955                    C. L. PETERSON                    2,720,315
                        FILTER AND METHOD FOR USING SAME
Filed May 16, 1949                                          12 Sheets-Sheet 11

INVENTOR.
C. Lynn Peterson

BY
ATTORNEY

Oct. 11, 1955   C. L. PETERSON   2,720,315
FILTER AND METHOD FOR USING SAME
Filed May 16, 1949   12 Sheets-Sheet 12

INVENTOR.
C. Lynn Peterson
BY
*H. A. McGrew*
ATTORNEY

_United States Patent Office_ 2,720,315
Patented Oct. 11, 1955

2,720,315

FILTER AND METHOD FOR USING SAME

C. Lynn Peterson, Salt Lake City, Utah, assignor to Peterson Filters & Engineering Company, Salt Lake City, Utah, a corporation Application May 16, 1949, Serial No. 93,555

9 Claims. (Cl. 210—201)

My invention is directed to filters, particularly to a new and improved form of top feed double drum filter and is related to my Patent No. 2,499,412, issued March 7, 1950.

In recent years there has been a growing demand for a filtering apparatus which could handle relatively coarse materials and/or materials of high specific gravity in large volume at low cost. Materials to which I refer fall generally within a size range of from about two-hundred mesh up to and including material passing through a three-eighths inch diameter opening, and may vary in density from very heavy metallurgical concentrates to relatively light material such as coal. The latter material presents a particularly difficult filler problem because of the enormous tonnage which must be handled, and the limitations of cost necessarily imposed on the process. Conventional filters such as the disc type or the single drum type, which revolve in a container disposed below the drum or disc, have proven unsatisfactory for this type of work in several respects, the most notable being their inability to successfully handle either large or heavy solids, since these materials sink to the bottom of the slurry container and are not picked up by the filter. Centrifuges offer somewhat more promise, but have proven to be uneconomical from a horsepower requirement standpoint, as well as having a high initial cost and maintenance.

Double drum or drum and roll filters of the type wherein a pool of material to be filtered is formed above two parallel filter rolls have been proposed several times in the past, as for example in Nijarian 1,449,774, dated March 7, 1923, and present initially several apparently decisive advantages over other forms of filters. These have failed to gain public recognition, however, due to various inherent defects in their design, as well as in the process for using them. By way of illustration, it has heretofore been considered necessary that the two revolving drums be carefully synchronized in order that a cloth or similar filter medium could be used over the deck of these drums without excessive wear. They have also been designed to employ wooden decks, with the result that the slight warpage occurring causes trouble by pressing the filter mediums together to cause excessive wear. Discharge of the cake with a satisfactorily low liquid content has also been difficult to attain in these double drum filters, since filtrate tended to contaminate the cake by blow-back when discharge was below the horizontal axis of the drums, and discharge at or above the horizontal axis tended to shorten the filter cake drying time.

In an effort to increase the efficiency, prior inventors have resorted to a very high submersion factor, theorizing that this would permit a build up of a more satisfactory cake, but this has also proven unsatisfactory, due to sealing difficulties, improper control of the time for cake formation, and improper cake formation. To reduce the cost of construction, the surface of the prior art filter drums have been divided into large compartments and these compartments have been subjected to vacuum for the maximum apparently permissible degree of submerged travel in an effort to yield economical performance. Furthermore, prior inventors have made considerable effort to avoid the formation of a homogeneous cake on the filter drum, theorizing that the small particles or slimes in the slurry could be best filtered if a layer of somewhat coarser material were first formed over the filter medium, thus in turn acting as a filter medium.

I have found that many of these theoretical concepts are partially or wholly incorrect and have devised a double drum or drum and roll filter which not only successfully overcomes practically all of the defects inherent in prior art designs, but which in addition develops certain new and highly advantageous characteristics not found in prior art structures adapted to perform similar functions.

It is therefore a major object of my invention to overcome the above described and other defects in prior art filters and the like through the provision of an improved method and apparatus for separating solids from liquids as by filtering.

More specifically, the important objects of my invention include the provision of a top feed double roll type of filter and method of filter operation, which provides an improved seal between the rotating drums, but which does not require synchronization of the speed of the drums, which when properly operated yields an improved filter cake of predetermined thickness without the use of a scraper or doctor blade for thickness control, which has a substantially increased filter cake drying time, which delivers a filter cake of unusually low liquid content, which requires relatively low quantities of power for operation, which substantially eliminates contamination of the filter cake by blow-back, and which incorporates an improved method and means for discharging filter cake from the filter drum.

Other important objects include the provision of a novel feeding method and apparatus for my filter, an improved drum and valve construction, a novel feed overflow, and a recycling arrangement, which in combination with my novel feeding method and apparatus, largely compensates for variations in volume and/or in the solids content of the feed slurry, and which incorporates means for accurately controlling phases of the filtering operation, particularly with reference to control of the extent and duration of negative pressure influence exerted on the filter compartment.

Other objects of my invention are to provide a method and means for substantially clearing the filter compartment and conduits of liquid before the cake is discharged and thereby substantially reduce blow back of filtrate into the cake, to provide economical means for constructing a filter drum having a large number of filter compartments, to reduce the cost of construction as by simplifying the method for forming filtrate and air conduits in the filter drum structure, to provide means for increasing the quantity of liquid which can be drawn from a filter cake during drying and at the same time effectively reduce the permeability of the cake, and volume of air utilized.

Further objects and advantages of my improved filter will be disclosed in the course of the following detailed description and in the appended drawings in which:

Fig. 1 is a partially broken away elevation of my filter illustrating the general arrangement of parts as seen from the driving end;

Fig. 2 is a partial cross section taken through the left hand filter drum as seen in Fig. 1 illustrating the general internal arrangement of the filter drums, as well as further details of the drive mechanism valve support, and feed structure;

Fig. 3 is a perspective of a portion of the feed apparatus;

Fig. 4 is a partial elevation of my feed apparatus;

Fig. 5 is a partial perspective of my feed overflow device;

Fig. 8 is another partial cross section through the periphery of the drum;

Fig. 9 is a diagrammatic cross section through the periphery of my drum and drum end;

Fig. 23 is a partially exploded perspective of my valve structure;

Fig. 24 is a perspective of a portion of my valve structure;

Fig. 25 is a partial perspective of my valve structure indicating the assembly of the adjusting device;

Fig. 26 is a partially sectioned elevation of one of the adjusting devices illustrated in Fig. 25;

Fig. 27 is a partial perspective of my valve mechanism illustrating the relationship of the parts shown in Fig. 23 when assembled;

Fig. 32 is a partially sectioned elevation of a modified form of filter;

Fig. 33 is a partial section taken along the center line of the drums, illustrating the disposition of the sealing member;

Fig. 34 is a schematic plan view of the drums also showing the arrangement of the sealing member;

Fig. 35 is a partially schematic plan view of the sealing arrangement for the drums;

Figure 6:
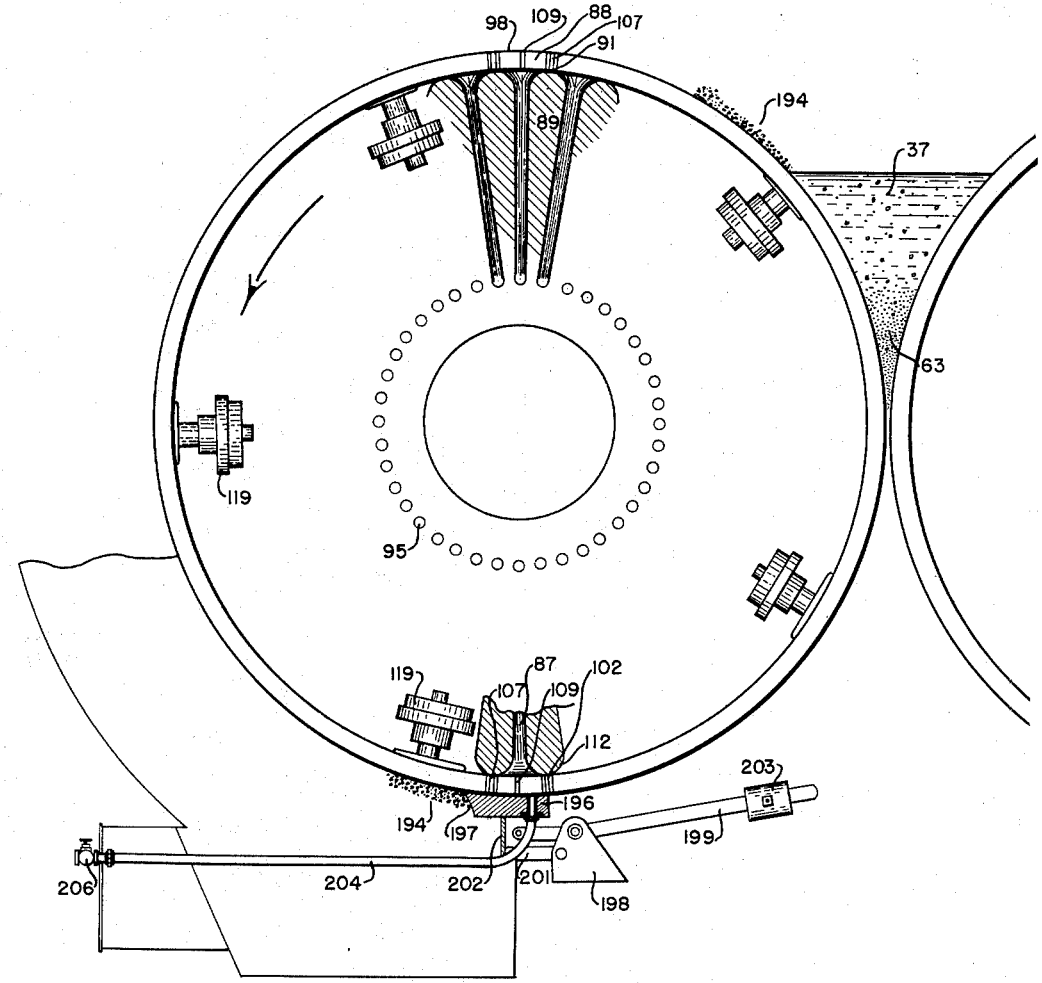
Fig. 6 is a partially sectioned, partially diagrammatic elevation of a filter drum.

In brief, my filter in its preferred form comprises a pair of rotatably mounted parallel drums at least one of which is a filter drum and which are provided with retaining plates bearing against the edges of the drums for retaining a turbulent pool of unfiltered slurry or magma above and between the drums. The filter drum includes a circumferential deck plate and a rigid, preferably metallic, filter medium spaced outwardly from the deck by longitudinal strips, which also serve to divide the filter drum into a plurality of relatively small, narrow and shallow compartments, generally parallel to the drum axis. Conduits for air and filtrate are formed in an end plate of the filter drum for interconnecting the filter compartments with my valve mechanism, which I utilize to synchronize not only the timing, but also the degree of application of positive or negative pressure to the filter compartments to suit the product to be filtered.

Both drums are driven in a direction which passes their surfaces upwardly through the pool of slurry, and are preferably not in contact with each other, the necessary seal between the drums being provided by a relatively static bed of particles which collect in the intervening space. This of course eliminates the need for matching the peripheral speed of the drums and greatly simplifies the construction of my filter. Contrary to previous concepts, I have found that a heterogeneous or stratified filter cake is not desirable for many reasons, and I therefore feed to the pool above the drums a quantity of thick slurry in amount up to as much as one-third again the capacity of the filter for some products, and in such manner as to cause maximum turbulence within the pool, the excess slurry being withdrawn by a novel overflow and recycled to the feed sump or similar apparatus ahead of the filter.

The overflow is carefully adjusted to maintain a substantially constant level in the reservoir somewhat below the crest of the drums, and the valve is adjusted to draw liquid from the reservoir through the filter medium and individual compartments only during an accurately predetermined portion of the time each compartment is submerged, this generally being the portion of the arc of travel of the compartment within the pool above the previously mentioned static bed of material forming the seal between the drums.

My valve incorporates means for regulating both the degree and time at which vacuum is applied to the compartments and for the rejection and recycling of the first, or cloudy, portion of the filtrate drawn into the compartment as the compartment enters the slurry. Control of these and other related factors yields a homogeneous cake on the filter drum of remarkable uniformity which exhibits substantially no tendency to slip from the surface of the drum back into the reservoir when the valve is properly adjusted.

Since the cake formed on my filter media is homogeneous, rather than heterogeneous, it is also relatively porous, and might in certain instances therefore require a disproportionately large vacuum pump, as well as excess operating power were it not for the action of relatively high frequency vibrators mounted within the drum, which not only compact the cake and thus reduce its porosity, but also aid in eliminating a substantially greater amount of the liquid trapped or occluded in the cake. These vibrators are particularly effective in my structure, since I employ a rigid and preferably metallic filter medium, which transmits the relatively high frequency low amplitude vibrations with little loss to the filter cake.

Blow back or contamination of the cake by filtrate remaining in the compartments and conduits at the time of discharge is substantially eliminated in two ways, the first of which is to balance the size of the compartments and conduits against the volume of air drawn through them to maintain the air velocity above a critical minimum which in effect sweeps the compartments and channels free of most of the liquid. Secondly, vacuum is maintained in the filter compartments until after the cake has been removed from the filter medium by a scraper, the latter being disposed approximately below the axis of the filter drum, or as it is frequently referred to, in a "six o'clock" position. Thus blow back is not only reduced to a minimum, but the drying time of the cake on the filter is substantially increased over that ordinarily available and contributes materially to the delivery of a filter cake having a very low liquid content.

The combination of the above-mentioned, as well as other subsequently described features and characteristics of my filter, are effective to make my filter unusually efficient both with respect to the cost of operation and maintenance and with respect to the total production of the unit per unit of floor space occupied. Proper control of the cake characteristics not only provides uniformity of operation, but also permits use of pumps having low horsepower requirements. Furthermore, the unusually low moisture content of the discharge cake will materially increase the capacity of associated apparatus, such as drying devices.

It should be understood that my filter is not particularly suited for the filtering of slurries containing only fine materials, such as those passing through a two-hundred mesh screen, since other forms of filters, as for example the conventional drum or disc filters, are quite suitable for this type of work. My filter is best employed on slurries wherein the solid particles range from a size passing a three-eighths inch diameter opening downwardly to those retained on a three-hundred twenty-five (325) mesh screen, this being particularly true where the materials have a relatively high specific gravity and are incompressible, as for example sands or other inorganic materials.

*General arrangement*

As previously indicated, my filter includes a pair of drums 36, 36', either or both of which may be filter drums. In certain instances the drum 36', for example, may have a solid surface and serve merely as means for confining a reservoir of slurry, indicated at 37, above the point of approximate tangency between the drums 36, 36'. Each of the drums 36, 36' are provided with hubs, generally designated 38 having suitable bearing surfaces 39 formed thereon, and which are in turn supported on suitable bearings 41. The bearings 41 are supported on a framework, generally designated 42, including a bed 43 having upright members 44 and cross members 46. Worm wheels 47 are secured to the hubs 38 of the drums 36, 36' and mesh with worms 48 interconnected by a shaft 49. A shaft 51 interconnects one of the worms 48 with a speed reducer 52 mounted on the bed 43, and driven by a suitable motor 53.

For convenience, flexible couplings 54 may be provided on the shafts 49 and 51. The worm gears 47 and worms 48 are enclosed in suitable housings 56. At the ends of the drums 36, 36' opposite to that to which the worm wheels 47 are attached, I provide valve structures, generally designated 57, each of which communicates with interconnected vacuum domes 58. Retainer plates 59 supported by the frame 42 bear against the edges of the drums 36, 36' to confine the reservoir 37 above the drums. These plates 59, which incorporate seals, may be of generally triangular shape and extend from a point somewhat above the crest of the drums 36, 36' downwardly to a point below the point of approximate tangency between the drums, this point being along a line connecting the parallel axes of the drums.

My drums 36, 36' are driven at approximately the same peripheral speed, but are not mounted in such manner that the peripheries of the drums are brought into contact with each other. On the contrary, a space is purposely provided between the drums, and as slurry is fed to the reservoir 37 through my feeding device, generally designated 62, a portion of the solid particles will settle to the bottom of the reservoir and bridge the space or gap between the drums, forming a more or less static bed, indicated at 63. When the particles in the slurry are quite coarse as, for example, where a considerable portion of particles approximating three-eigths of an inch in diameter are present, the space between the drums may be less than the diameter of the largest particles commonly found in the slurry. However, it should be understood that this is not always necessary since I have successfully operated my filter with a 0.88 mm. opening between the drums and utilized this structure to filter a slurry wherein the coarsest particle was approximately 0.208 mm. in diameter. Thus it may be seen that even with a relatively fine maximum particle size in the slurry, the space between the drums will be sealed by the static bed and it is therefore unnecessary to carefully synchronize or match the peripheral speed of rotation of the drums.

It is contemplated that the slurry fed to the reservoir 37 through my feeding device 62 will be drawn from a jig, thickener or similar device adapted to discharge a slurry containing a relatively high percentage of solids, and is fed in quantities substantially in excess of the capacity of the filter. The depth of the reservoir 37, however, is maintained at a point below the crest of the drums 36, 36' by suitable overflow devices, generally designated 64, provided in either or both of the plates 59, the excess feed being recycled through launders to either the feeding device 62 or some prior point in the circuit for subsequent passage through feed device 62. The drums 36, 36' are driven in directions which bring their surfaces upwardly through the reservoir 37, and during this passage vacuum or negative pressure is applied to the filter drums 36, 36' through the valve structure 57 to form a filter cake on the surface of the drums. This vacuum is preferably maintained until the cake has been discharged by a scraper device, indicated at 67, which is preferably disposed below the axis of the drums, or as it is frequently termed, in a "six o'clock" position.

The cake falls from the scraper device 67 into discharge chutes or conveyors 68, from which it is discharged for further processing or treatment.

*Feed and overflow*

My filter is particularly well adapted for the removal of liquids such as water from a relatively coarse feed, containing particles for example ranging in size from those passing a screen having three-eighths inch openings down to particles of a size which will just pass a two-hundred mesh screen, and is most efficient on particles in the coarsest ranges. A typical example of this will be found in dewatering coal, where great volumes of material must be handled efficiently at low cost. In such an operation a relatively thick slurry or magma of coal and water, or the like is fed to my filter through a trough 69 disposed above the filter. A chute 71 conducts the slurry from the trough 69 downwardly to a distribution well 72. The portion of the chute 71 nearest the chamber 72 preferably decreases in depth and increases in width, as indicated at 73, to insure a generally even feed of material to the well 72.

The well 72 is generally rectangular in shape and extends laterally across the reservoir 37 midway between the drums 36, 36'. The well 72 also includes inwardly converging lower walls 74, which define a rectangular outlet 76 below the level of the reservoir 37. It will be noted by those skilled in the art that this type of feed arrangement will deliver the slurry to the reservoir 37 with a high degree of turbulence, and will tend to keep at least the upper portion of the reservoir 37 in a turbulent condition, suspending all but the coarsest particles in the reservoir. The coarse particles, however, will be of sufficient mass to settle towards the bottom of the reservoir 37 and form a part of the static bed 63 between the drums 36, 36'.

Since the amount of slurry fed to the filter should exceed by approximately one-third or more the capacity of the filter, it is obvious that the excess must be discharged through the overflow devices 64, if the level of the reservoir 37 is to be maintained. As subsequently explained it is necessary to the proper operation of my filter that this level be maintained, and I therefore employ an overflow device, illustrated most clearly in Fig. 5. The plates 59, which retain the reservoir 37 between the drums 36, 36', are notched, and angle members 77 are welded to the plates 59 around the notch to guide an overflow plate 78, as well as to seal the assembly against excessive leakage. The plate 78 is cut to provide a V-shaped weir, indicated at 79, of approximately sixty degrees, through which the excess slurry is discharged. The plates 78 may also be provided with a number of aligned openings 81, which may be engaged by a pin 82, thus fixing the level of the weir 79. I have found it particularly advantageous to employ a sixty degree opening for discharging the overflow into the launders 66, since the discharge area increases rapidly with a very slight increase in height. This increase is proportionate to the average variations in flow density and volume which may be expected in the course of normal operation, and serves in effect to compensate for feed variations. Adjustment of the overflow is therefore required very infrequently. It will be understood, of course, that under ordinary circumstances two overflow devices 64 are provided on each filter, but under certain operating conditions, one may be sufficient.

*Drum structure*

Ordinarily both of the drums 36, 36' will be filter drums, substantially identical in structure, since this greatly increases the capacity of the filter per unit of floor space. Other double drum filters have employed drums of relatively conventional construction and have utilized cloth or similar filter medium disposed around the drum periphery to entrap the solids in the slurry. I prefer, however, to employ a rigid metallic filter medium of a type herein described, since by so doing the efficiency of the operation is greatly increased and the frequency of the repairs markedly reduced.

As the drums 36, 36' are substantially identical, the structure of the drum 36 only will be described in detail. The drum 36 includes a peripheral metal deck 83 having an end plate 84 for the driven end of the drum and an end plate 86 for the valve end of the drum. The end plate 86, which may be secured to the deck 83 as by welding, is formed with a number of radially disposed channels 87 in its outer surface. These channels extend radially from the port circle of the filter and flare outwardly at their upper ends, as indicated at 88, thus defining elongated, generally triangular lands 89 having rounded upper extremities 91. An outer end plate 92 having a flat inner face is secured against the end plate 86 as by bolts 93, and is preferably formed integrally with the hub 38 on the valve end of the drum. A series of axially disposed, spaced openings 95 are formed in the hub portion of the plate 92, and are aligned with the channels 87, forming in combination therewith conduits through which liquid may be drawn into the valve assembly 57. When the outer end plate 92 is in position it will rest against the lands 89, and the channels so defined communicate with the space immediately above the deck member 83. The outer plate 92 extends outwardly somewhat beyond the deck plate 83 to the plane of the filter medium, generally designated 98, which extends over the entire surface of the drum and abuts the end plates 92 and 84.

To retain the reservoir in position above the drums 36, 36', I provide a wearing surface 94 on the edge of the end plate 92 against which arcuate seal members 214 are supported. The seal members 214 extend downwardly toward each other and toward the point of tangency between the drums 36, 36', meeting at a point somewhat above the line of tangency. A plate 216 (Fig. 35) is recessed to fit over the ends of the seal members 214 and is secured thereto as by rivets 217. The plate 216 extends downwardly past the line of tangency and is in close contact with the peripheral portion of the face of the plates 92. As shown in Fig. 33, the plate 59 is secured as by rivets 219 to the upper inner edge of the seal 214 in such manner that its inner surface is flush with the inner face of the seal, and extends laterally between the drums at a level somewhat above the crest of the drums.

Hangers 218 are secured at one end to the seal members 214 and at the opposite end to a frame member, and are internally threaded to force the seal 214 downwardly against the surface 94, thus insuring the maintenance of a satisfactory seal at this point. Similar hangers 221 extend horizontally from other frame members into contact with the outer face of the plate 216, and serve to force the plate 216 into sealing engagement with the plate 92. It should be understood, of course, that springs may also be utilized within the hangers 218 and 221, if desired.

Figure 36:
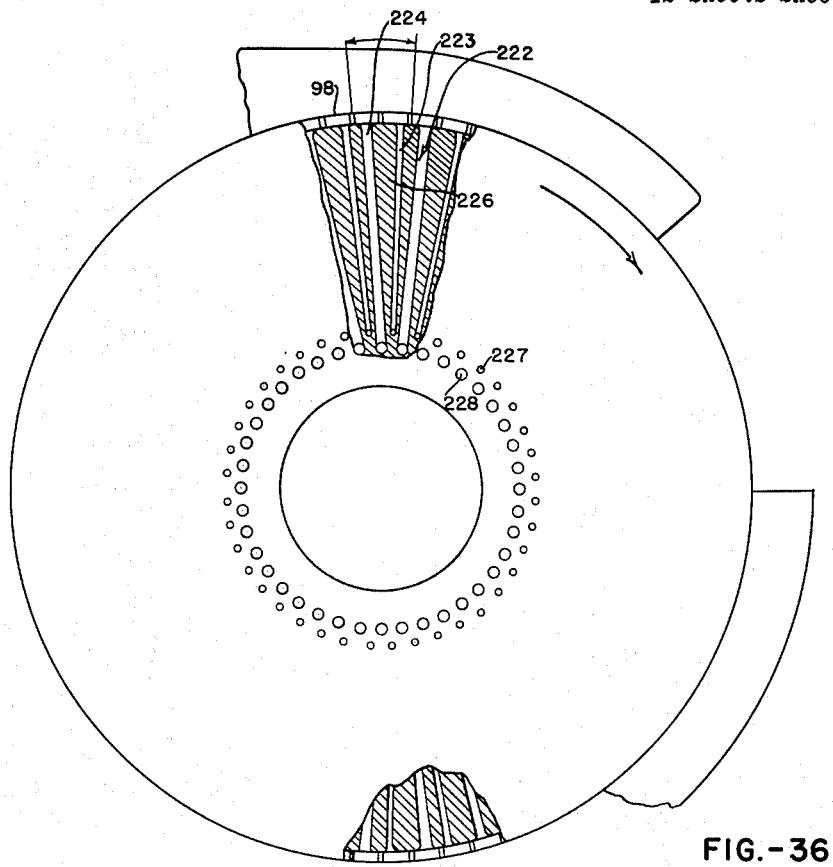
Fig. 36 is a schematic partially broken away elevation of a portion of a modified drum.

An alternative form of end plate structure is illustrated in Fig. 36 in which I may substitute for the end plate 86 a circular plate 222, generally similar to the plate 86, but which provides an increased number of drainage channels communicating with each filter compartment. A relatively narrow and shallow groove 223 is formed in plate 222 for each compartment and constitutes a lead filtrate conduit, meaning thereby that a channel 223 communicates with the forward or leading edge of each compartment.

Another groove 224 of somewhat larger dimensions is also provided for each of the compartments and constitutes the trailing or main filtrate channel, the grooves 223 and 224 defining a land 226 between the grooves for each compartment. The leading channels 223 communicate with a series of ports 227 arranged in a circle concentric with the axis of the drum while the trailing channels 224 communicate with ports 228 arranged in a circle concentric with but of somewhat smaller diameter than the circle defined by the ports 227. This type of structure increases to some degree the ease of control when dealing with certain types of slurry.

Figures 11, 12, 13, 14, 15, 16, 41:
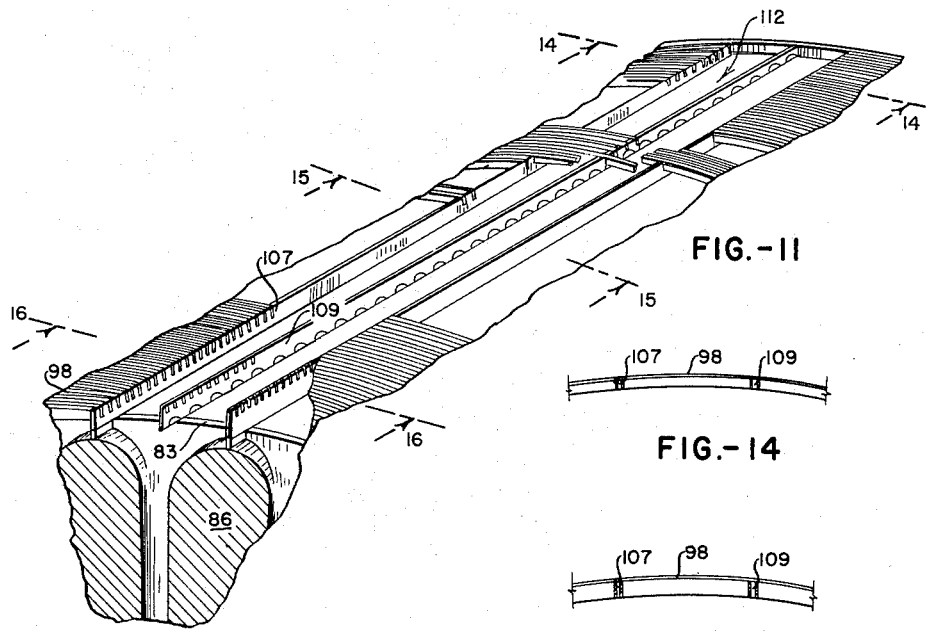
Fig. 11 is a partial perspective view of the surface of my filter drum, a portion of the filter medium being broken away to illustrate the structure more clearly.
Fig. 12 is a perspective of a small portion of a preferred form of my filter medium.
Fig. 13 is a partial perspective of the filter medium shown in Fig. 12.
Fig. 14 is a partial cross section taken along the line 14—14 of Fig. 11.
Fig. 15 is a partial cross section taken along the lines 15—15 of Fig. 11.
Fig. 16 is a partial cross section taken along the lines 16—16 of Fig. 11.
Fig. 41 is a partial perspective view of another form of metal filter medium.
Figure 29:
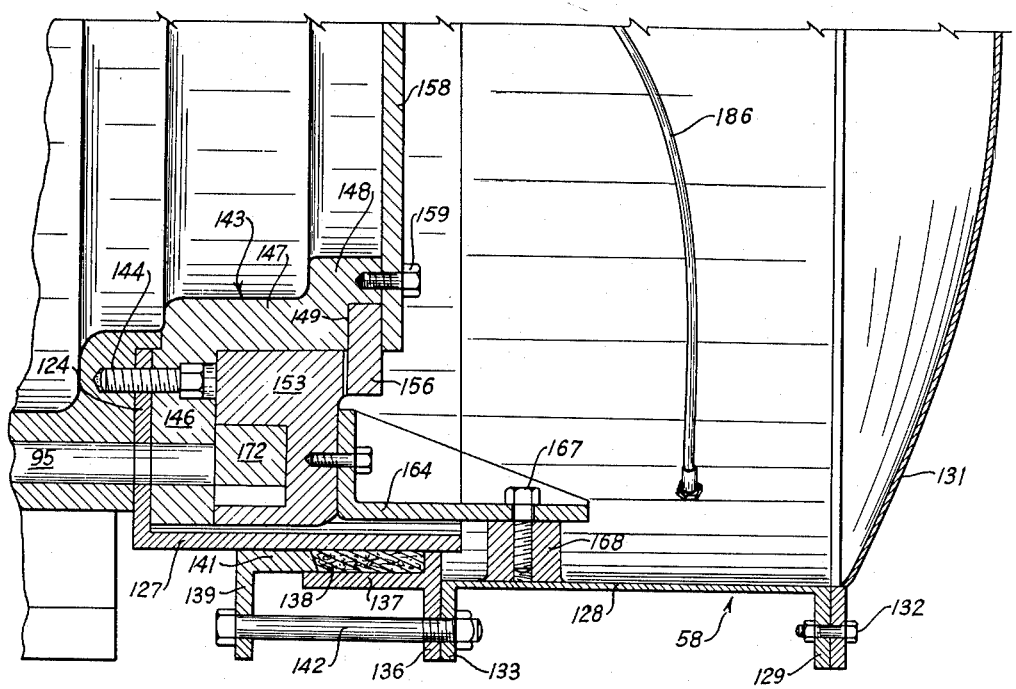
Fig. 29 is a partial cross section through another portion of my valve mechanism.
Figure 30:
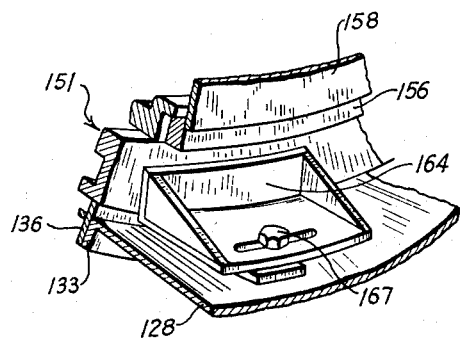
Fig. 30 is a partial perspective of another portion of my valve mechanism illustrating the adjusting device.

My preferred form of filter media is best illustrated in Figs. 11, 12, and 13, and is formed entirely of metal such as stainless steel. The filter medium includes a plurality of relatively small bars 99 having rectangular lower sections 101, and unitarily formed outwardly flaring upper sections 102. The bars 99 extend peripherally around the drum surface and are accurately spaced to provide a small peripherally extending opening 103 between the bars through which the liquid may pass. The bars include aligned openings 104 at frequent spaced intervals through the lower sections 101 through which rods 106 extend. U-shaped main support members 107 fit over the rod 106 and are suitably notched to receive the bars 99 of the filter medium 98.

Figure 18:
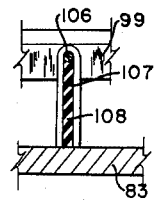
Fig. 18 is an elevation of a portion of my filter medium and drum structure.
Figure 22:
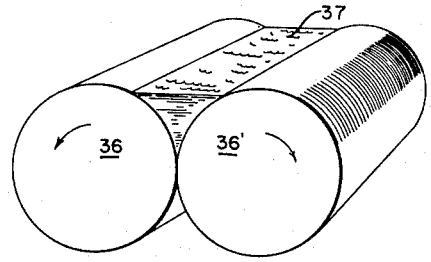
Fig. 22 is a diagrammatic perspective illustrating the movement of the filter drums.
Figure 19:
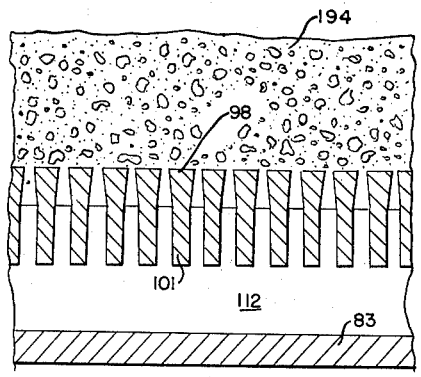
Fig. 19 is a diagrammatic elevation of my filter medium illustrating the disposition of the filter cake thereon.
Figure 20:
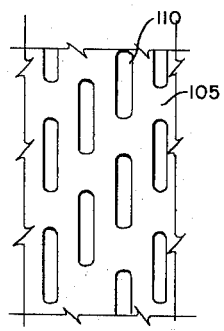
Fig. 20 is a partial plan view of a modified form of filter medium.

Within the main support members, as best shown in Fig. 18, I provide a gasket 108 of compressible material, such as rubber, disposed below the rod 106 in such manner that as the main support member 107 is drawn downwardly into contact with the deck 83, the gasket 108 will be compressed and form a liquid- and airtight seal between support members. The space between the main support members therefore defines the compartments of my filter which are relatively narrow and shallow in comparison with the filter compartments ordinarily employed.

Figure 17:
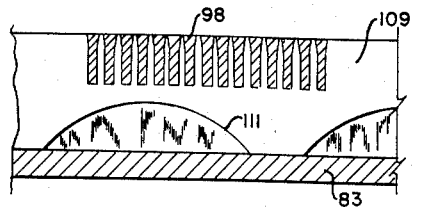
Fig. 17 is a partially cross sectioned elevation of a portion of my filter medium.

To insure both rigidity and proper alignment, I also employ intermediate members 109, as shown in Figs. 11, 13 and 17, which are also U-shaped in cross section and which may, if desired, include a rod 106 as previously described. The lower edge of the intermediate supports 109 are notched as at 111 to permit the free flow of material within each filter compartment, designated 112. Preferably the filter media is assembled by sections, and is secured to the deck 83 by studs 113 welded to the deck 83, and projecting upwardly through suitable openings in the medium 98. The medium is secured to the studs 113 as by welding or brazing, thus forming a smooth, rigid, metallic filter medium. If desired, the main support members 107 may also be welded to the bars 99, as indicated at 114. The main support members 107 project along the surface of the drum parallel to the axis into engagement with the outer end plate 92 and rest upon the crest of the curved upper extremities of the lands 89. Each channel 87 therefore communicates directly with one compartment 112.

Figure 21:
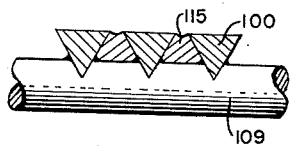
Fig. 21 is a partial elevation of a modified form of filter medium.
Figure 10:
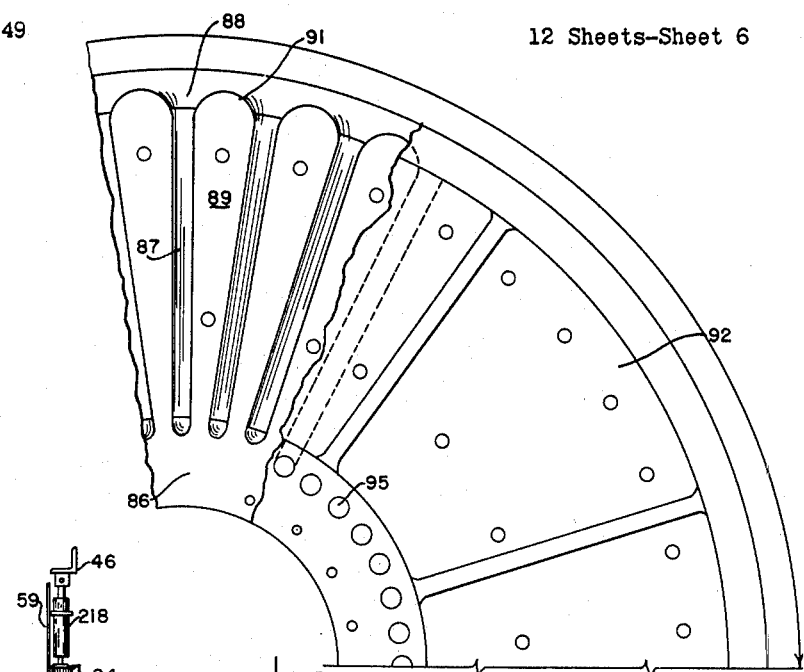
Fig. 10 is a diagrammatic partial elevation, partially cross sectioned, of an end of my filter drum.
Figure 28:
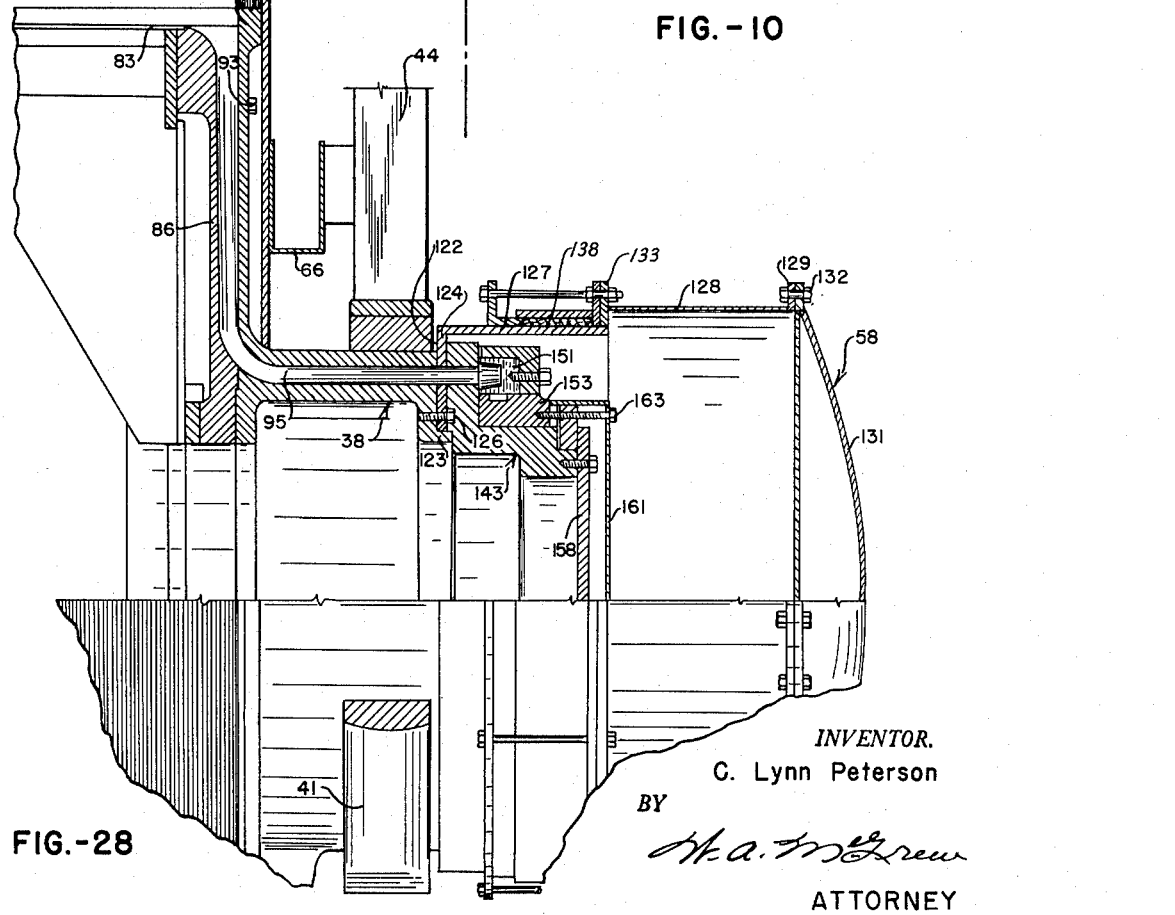
Fig. 28 is a partially sectioned elevation of my valve mechanism.

In place of the bars 99, I may employ bars 100 of triangular shape, as shown in Fig. 21, secured as by welding, indicated at 115, to support members 109 and 107, or the like. The weld 115 should fill the space between the bars 100 and above the supports 109 and 107 to the surface of the bars 100 as indicated in Fig. 21, thus effectively separating the compartments. In certain instances it may also be desirable to employ perforated sections 105 having relatively small elongated openings 110 formed therein in lieu of the bars 99 or 100. Round bars 229 may also be substituted for the triangular bars 100 and secured as by welding to longitudinally disposed round supports 231, weld being indicated at 232 and filling the space between the bars 229 to their surface level. The round supports 231 are substitutes for support member 107 and 109 and rest on compressible gaskets 233 interposed between the supports 231 and the deck 83.

The deck 83 is preferably inclined somewhat towards the valve end of the drum in such manner that the depth of the compartment increases gradually towards the valve end. This structure is illustrated in Figs. 8, 11, 14, 15 and 16. It should not be understood that this type of structure is essential; but is, as subsequently explained, desirable in certain types of filters. If the type of material being filtered is such as to create the possibility of a highly adherent, waxy deposit on the medium 98, I may also provide a plurality of downwardly extending conduits 116 extending from the compartment 112 through the deck 83 to an axially disposed manifold 117, which communicates with the conduits 87 through a check valve 118, the latter being arranged to permit the flow of fluid into the manifold from the valve, but to prevent flow in a reverse direction. This check, as subsequently explained, is utilized for distributing air under positive pressure to the compartment to clear the medium 98 of the waxy deposit, and is not essential if the dimensions of the manifold are properly related to the dimensions of the compartment.

Figure 31:
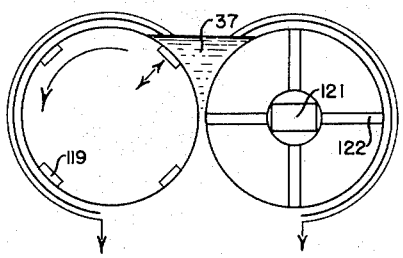
Fig. 31 is a diagrammatic elevation of filter drums illustrating vibrator disposition.
Figure 7:
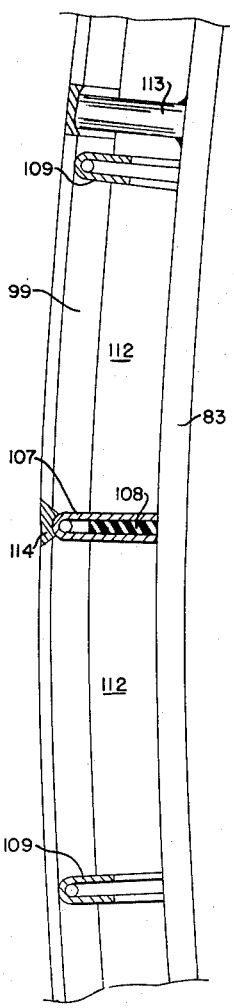
Fig. 7 is a partial cross section taken through the periphery of my filter drum.

As shown in Fig. 6, I may also provide a plurality of vibrators 119, mounted within the drum and in contact with the inner surface of the deck 83 to transmit their vibratory energy through the filter medium to the cake formed thereon. These vibrators are preferably electrically driven and are of the relatively high frequency, low amplitude type having, for example, an approximate frequency of 1000 to 5000 vibrations per minute and amplitude of less than $1/16''$. Another possible vibrator arrangement is illustrated in Fig. 31, wherein I have shown a vibrator 121 disposed within a spider 122 of metal, having arms extending outwardly into engagement with the internal surface of the deck 83. Other arrangements of the vibrators are of course possible provided they are disposed to transmit vibrations through rigid material to the filter medium 98.

Valve structure

The hub 38 on the valve end of the drum, which is formed integrally with the outer end plate 92, projects axially beyond the bearings 41 and is machined to present a smooth face, indicated at 122, having an axially extending shoulder 123 near its inner face. Spaced openings 95 formed in the hub 38 on the valve end of the drum communicate at one end with the channels 87 formed in the end plate 86, and terminate at the surface 122, forming the port circle for the valve. A radially disposed ring 124 is held securely against the surface 122 as by bolts 126, and is provided with an axially extending peripheral skirt 127. The vacuum domes 58 include a cylindrical member 128 having an outer peripheral flange 129 to which a vacuum dome cover 131 is secured as by bolts 132. The inner end of the cylinder 128 is also provided with an outwardly extending peripheral flange 133. Both domes 58 are connected rigidly to a suitable conduit 134, which may in turn be connected to a vacuum pump, or the like.

To provide a satisfactory seal between the vacuum domes 58 and the skirts 127, I provide a radially extending ring 136 secured to the outer surface of the skirt 127 near its outer end and disposed to engage the flange 133 on the cylinder 128. An axially disposed cylindrical member 137 is secured to the ring 136 concentric with the skirt 127 and spaced therefrom to provide space for suitable packing 138. To hold the packing in a suitable state of compression, I provide a ring 139 having formed integrally therewith an axially extending flange member 141 of suitable thickness to enter the space between the skirt 127 and the cylinder 137, thus compressing the packing 138. Bolts 142 extending through the rings 139 and 136 and the flange 133 may be employed to compress the packing 138. The ring 124 is provided with a plurality of openings aligned with the spaced opening 95 and of similar size. A wear plate, generally designated 143, is secured to the hub 38 as by bolts 144 extending through an outer radially disposed flange 146 of the wear plate and the ring 124. The flange 146 of the wear plate 143 is also provided with a plurality of spaced openings of similar size and in registry with the openings 95.

The flange 146 extends laterally from a body member 147 of the wear plate, the body member being generally cylindrical in shape and integrally formed with the flange 146, which is disposed at the inner extremity of the body member 147. An integrally formed, inwardly extending flange 148 is also provided at the outer end of the body member 147, and is shaped to provide an external peripheral shoulder, indicated at 149.

To control the timing and degree of vacuum application to the filter compartments during the period in which the compartment is moving from the scraping device 67 to its point of emergence from the reservoir 37, I provide a valve shoe, generally designated 151, which is generally semicircular in shape and of channel shaped cross section. The shoe 151 is held in position against the wear plate 143, as indicated in Figs. 23 and 27, by a bracket 152 secured to a cylindrical bridge member 153. The bracket 152 extends laterally from the outer periphery of the cylindrical bridge member 153 to which it is secured, and is of channel shaped cross section to fit over the valve shoe 151.

Openings 154 are provided to secure the shoe 151 firmly to the bracket 152, this being accomplished approximately at the mid-point of the shoe. A ring 156 is fitted over the outer end of the wear plate 143 against the shoulder 149 and bears against the outer surface of the bridge 153, the ring being secured in position to the bridge as by bolts 157, Fig. 27. A flat cover plate 158 is secured to the outer end of the wear plate 143 as by bolts 159, and extends radially outwardly a distance sufficient to engage the outer surface of the ring 156. A semi-circular plate 161 having an inwardly extending peripheral skirt 162 fits over the upper portion of the cover 158 and the ring 156, and is secured in position as by bolts 163 extending through the ring 156 into the bridge 153. Thus as the drum rotates, the cover 158, the wear plate 143, and the ring 124 will turn with the drum; while the shoe 151, the bridge 153, the ring 156, and the member 161 will remain stationary.

To fix the position of the bridge 153, I provide an axially extending lug 164 secured to the face of the bridge 153 and provided with a slot 166 through which a bolt 167 extends into engagement with a boss 168 fixed to the cylinder 128. The lower end of the shoe 151 is secured to a bracket 149, which is in turn secured to the bridge 153 and disposed near the position at which the cake is to be discharged from the filter drum. The bracket 169 is also provided with a slot 171 through which a suitable bolt (not shown) may extend into engagement with a cutoff 172 of generally rectangular cross section. The cutoff 172 is curved to fit smoothly against the outer periphery of the bridge 153, and is cut away at one end, as indicated at 173 to provide a wall 174 tapering inwardly towards the axis of revolution. The bracket 169 is channel shaped and fits over the cutoff 172 in such manner as to hold the cutoff in firm sliding engagement with the flange 146 of the wear plate 143 as the latter revolves with the drum.

From the foregoing, it will be seen that as the drum revolves the positive or negative pressure influence existing in the vacuum domes 58 will be communicated to the conduits 87, except during such periods of time as the communication is blocked by the shoe 151. To this end I provide a number of openings 175 in the shoe 151. These openings 175 are preferably of circular configuration on the face of the shoe opening into the vacuum drum 58. The inner face of these openings may, if desired, be of rectangular configuration. It will be understood that the position of the openings 175 are such that they will be brought into registry with the various openings formed in the wear plate 143, this being true regardless of whether these openings are arranged in a single circle or in a plurality of circles as illustrated in Fig. 36.

To control the degree of positive or negative pressure influence exerted in the compartments 112 as they pass through the reservoir 37, I provide a semi-cylindrical plate 176 secured to and spaced from the shoe 151 by legs 177. The plate 176 is provided with a series of threaded openings, indicated at 178 through which threaded valve stems 179 extend. A flat cylindrical valve 181 having a diameter greater than that of the openings 175 is secured to the inner end of the stems 179 in such manner that as the stem 179 is turned inwardly, the valve 181 will wholly or partially close the opening 175. A second spaced plate 182 is mounted on the outer face of the plate 176 and is provided with openings 183 aligned with the openings 178 in the plate 176. In these openings 183 I secure ferrules 184, which are in turn secured to an outer fixed covering 186 of flexible shafts, generally designated 187. Within the outer covering 186 is a flexible core 188 extending through the ferrules 184 and terminating in a tip 189 having a flat surface for sliding engagement with a corresponding opening formed in the outer end of the valve stem 179. Thus as the core 188 is rotated, the valve stem 179 and the valve 181 are moved inwardly or outwardly towards or away from the openings 175. The opposite ends of the flexible shaft 178 are provided with similar ferrules and extend through the wall of the cylinder 128 of the vacuum drum 158 in a convenient location for adjustments by the operator.

Since the first portion of the filtrate drawn through the openings 175 is usually cloudy, I also provide in the valve shoe 151 one or more openings 191, known as cloudy ports. A nipple 192 extending through the plate 176 conducts the cloudy filtrate from the opening 191 to a tube 193, which may be in turn connected to a suitable source of vacuum and a filtrate channel through which the cloudy filtrate may be recycled to the reservoir 37. If desired, similar openings and connections may be provided for venting each compartment as it enters the reservoir 37.

*Discharge*

As shown best in Figs. 1 and 6, I prefer to allow my filter cake, indicated at 194, to remain on the filter drum until it reaches a position approximately under the axis of the drum, at which time it is removed by the scraper device 67. During this period of time the compartment remains under vacuum and it is therefore necessary to provide means for maintaining this vacuum while the cake 194 is removed from the drum if contamination of the cake by filtrate remaining in the system is to be avoided. I therefore provide a scraper shoe 196 having a width somewhat greater than the width of the compartments 112, and a length sufficient to extend across the drums 36, 36'. The inner face of the shoe 196 is formed to fit snugly against the outer surface of the filter medium 98, bearing against the face of the bars 99. In some instances it may be desirable to provide a shaped leading edge on the shoe 196 to project a very short distance downwardly into the space between the bars 99. The leading edge of the shoe 196 is tapered, as at 197, to force the cake 194 outwardly away from the drum, where it falls to the conveyor 68. It is, of course, highly desirable that the shoe 196 be maintained in firm engagement with the surface of the drum. I therefore provide a parallel motion linkage comprising a support 198 fixed to the frame and pivotally supporting an upper arm 199 and a lower arm 201. The ends of the upper and lower arms 199 and 201 are pivotally secured to members 202 projecting downwardly from the shoe 196 to provide a double fulcrum arrangement, thus forcing the shoe 196 to move in a straight line, rather than in an arc. The upper arm 199 may project laterally in an opposite direction beyond the support member 198 and slidably support a movable weight 203, which may be moved inwardly and outwardly to increase or decrease the pressure of the shoe 196 against the drum.

If a high degree of vacuum exists in the compartment as it passes across the face of the shoe 196, excessive friction may be developed over and above that necessary to insure sealing and satisfactory discharge. I therefore provide a conduit 204 extending through the shoe 196 and provided with a valve 206 by means of which the vacuum in the compartment 112 may be wholly or partially reduced.

*Alternative form*

As previously mentioned, it is not in all instances essential that both the drums 36, 36' be filter drums, nor is it necessary that they be of identical diameter. I have illustrated in Fig. 32 a modified form of filter substantially similar to that illustrated in Fig. 1, but which incorporates a blank roll 207 mounted on an axis parallel to and somewhat above the axis of the filter drum 36'. In this form I prefer to mount the drum 207 in such manner that the crests of the filter drum 36' and the drum 207 are approximately level, and with a small space existing between the drums as previously described.

The drum 207 which has a smooth imperforate surface, may be driven through a worm and gear 208 similar to that previously described and connected as by shafts 209 to shafts 51 through gear boxes 211. Although the drum 207 presents a solid, imperforate face to the reservoir 37, a certain amount of material will adhere to the drum and may be removed by an auxiliary mechanism 67' mounted below the drum 207. Sprays 212 may be mounted in any desired position to wash either the drum 36' or the drum 207. If, however, sprays are employed to clean the drum 36' they are preferably placed between the scraper mechanism and the point of tangency between the drums to avoid interference with the cake formed on the surface of the drum 36'. In other respects the arrangement and operation of this modified form is substantially similar to the form illustrated in Fig. 1.

Operation

For the purpose of illustrating the operation of my filter, it may be assumed that my filter forms a part of the processing apparatus employed in the treatment of coal, and that material fed to my filter consists of a relatively thick slurry of coal particles in water, ranging in size from approximately three-eighths inch down to about two-hundred mesh. My filter is usually employed in conjunction with a dewatering apparatus, such as a jig or thickener which eliminates a portion of the excess water from the coal before it is fed to my filter as a relatively thick slurry through the trough 69.

The slurry is fed from the chute 71 downwardly into the chamber 72 in a manner which purposely induces considerable turbulence both in the chamber 72 and in the reservoir 37. The discharge of the slurry through the opening 76 also aids in maintaining the reservoir 37 in a condition of turbulence sufficient to suspend therein all but the heaviest particles in the slurry. The heavier particles gradually settle downwardly to the bottom of the pool, forming the static bed 63. The term "static bed" is applied to this collection of material, since in operation it is not continuously moved or suspended in the liquid, but remains in a relatively quiescent state, with only relatively small portions of the bed being picked up by the filter drum or drums and removed in the filter cake.

The quantity of material fed to the filter through the chute 71 is maintained at a point substantially in excess of the capacity of the filter to process, the excess slurry passing through the overflow devices 64 into the launders 66 from which it is recycled to the filter either directly or through other preceding devices.

It was heretofore thought that the pool of material maintained above the drums should be relatively quiescent and that vacuum or negative pressure should be applied to the filter compartments at the moment they enter the reservoir, the object being to pick up as much material as possible, and preferably to obtain some degree of stratification in the cake with the coarsest particles against the filter media and the fines, or slimes, deposited upon the coarsest particles. I have found this to be undesirable and have therefore deliberately provided for the maintenance of turbulence in the reservoir 37, thus insuring the formation of a homogeneous, rather than a heterogeneous or stratified filter cake, wherein particles of various sizes are more or less evenly distributed throughout the cake.

At a subsequently defined point, while the compartment is immersed in the reservoir 37, vacuum is applied to the compartment through the valve 57, drawing filtrate and solids towards the filter medium. The filter medium initially stops the passage of the greater part of the solid particles, but a certain portion of the very fine particles will pass between the bars 99 and flow along the deck 83, which forms the bottom of the compartments 112 into the channels 87, thence through the openings 95 and out into the vacuum drums 58 through the openings in the valve shoe 151. The shoe 151 is, however, positioned in such manner that the first portion of the filtrate, herein termed the cloudy filtrate, will pass through the opening 191 and the nipple 192 into the tube 193, thus separating the cloudy filtrate from the clear filtrate. As the drum continues to rotate, however, subsequent portions of the filtrate drawn through the valve mechanism 57 will pass through the openings 175, the flow being regulated by the position of the valves 181 mounted near the discharge side of the shoe 151.

In most instances the compartment 112 is subjected to vacuum or negative pressure from approximately the time it approaches the upper portion of the static bed 63 until it reaches the scraper device 67, thus permitting a maximum of moisture removal or increased drying time on the filter. Since the degree of vacuum applied to the compartments is closely controlled and regulated both as to time and degree of application through the proper adjustment of the valves 181 and the position of the shoe 151, the depth of the cake on the medium is closely controlled and exhibits little or no tendency to slide back into the reservoir 37 or fall from the surface of the drum as the compartment emerges from the reservoir.

Furthermore, since the negative pressure differential is applied to the compartment only while the compartment is passing through the upper portion of the reservoir, a cake is formed only after the angle of the surface of the filter medium is less than the angle of repose of the cake, which tends to prevent sluffing off of the cake after it has been formed and permits the efficient formation of a somewhat thicker cake. The vacuum continues until the cake has been discharged from the media by the scraper shoe 196, at which time the corresponding opening 95 passes under the cutoff 172.

The depth of the static bed will vary to a certain extent with the type of material and the per cent solids in the slurry being filtered and must be of sufficient depth to adequately seal the space between the drums. Ordinarily, however, if the depth of the static bed is approximately equal to the width of a filter compartment, an adequate seal will be formed.

Since the wall 174 of the cut away portion 173 on the cutout 172 slopes inwardly towards the axis of a drum, the operation of the cutoff will be gradual, rather than abrupt, and will be slowly diminished until the opening 95 has passed into and under the imperforate portion of the shoe 151. This portion generally represents the arc of travel between the point at which the cake is discharged and the point at which the corresponding compartment has passed through the static bed. In this portion of the travel, sprays 212 may be employed to clean the filter medium, and if desired an opening 213 may be formed in the shoe 151 and connected to a suitable conduit (not shown) for the application of positive pressure to the compartment, thus assisting in cleaning of the medium of any solids.

The application of positive pressure is particularly important when the material being filtered tends to form waxy deposits on the filter medium. In such instances, the structure shown in Fig. 9 is particularly advantageous since the air under super-atmospheric pressure will be distributed along the compartment by the manifold 117 and thus will act evenly upon the deposit. In the absence of a manifold 117, the pressure of the air moving toward the filter compartment through the channels 87 tends to force the waxy deposits from the filter medium at a point near the junction of the compartment and the channels 87. This, of course, relieves the pressure of the air and prevents removal of the deposits from other portions of the filter media along the compartment. If the pipes 116 are relatively small, the check valve is in some instances unnecessary.

There are a number of factors which must be properly correlated in the construction of my filter if efficient operation is to be attained. For example, the depth of the reservoir should be held to a minimum, not only to facilitate control of pick up time, but also to increase the total length of time to which the cake on the filter medium is subjected to the drying action of air drawn into the filter through the cake. The point at which each compartment is subjected to the influence of negative pressure while passing through the reservoir and the degree of such pressure also have a very important bearing upon the efficiency of operation, since they directly influence the thickness and other characteristics of the cake formed on the filter medium. Failure to properly control cake formation results in a sluffing off or falling of the cake from the filter medium into the reservoir as the compartment emerges from the reservoir. I have found that accurate control necessitates the use of narrow compartments. This dimension must, however, also be correlated with the diameter of the port circle and the diameter of the port forming the port circle, since both of these measurements limit the practical minimum compartment width. The compartment width is also related to the minimum reservoir depth, since it is obvious that this depth must be greater than the width of a single compartment to prevent loss of vacuum by exposing a portion of the compartment directly to the atmosphere so that air would be drawn through the passages in preference to filtrate.

Figure 37:
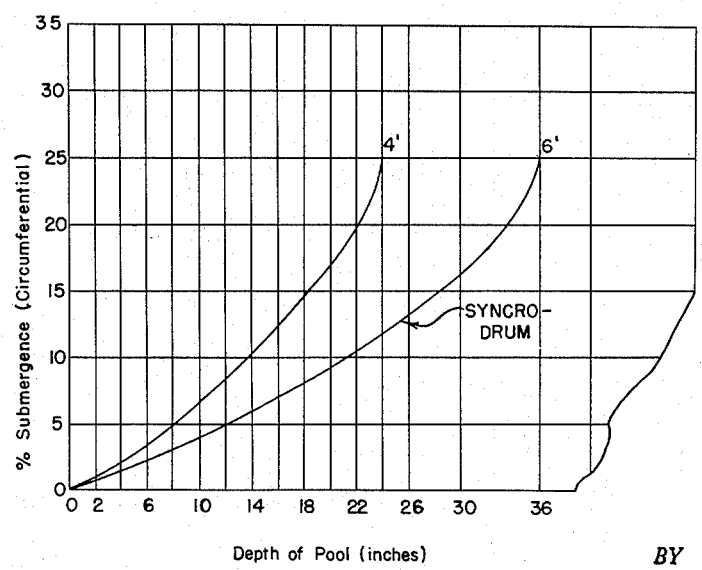
Fig. 37 is a graph illustrating the change in the percentage of submergence with respect to the depth of the pool for two different diameter drums.

Insofar as the depth of the reservoir is concerned, I have found it practical to closely control this parameter, since my filter is substantially less sensitive to variations in depth than are conventional drum or disc filters. This is illustrated in Fig. 37, which demonstrates graphically the relatively minor change in total filter area submerged with a variation in the depth of the reservoir.

Figure 38:
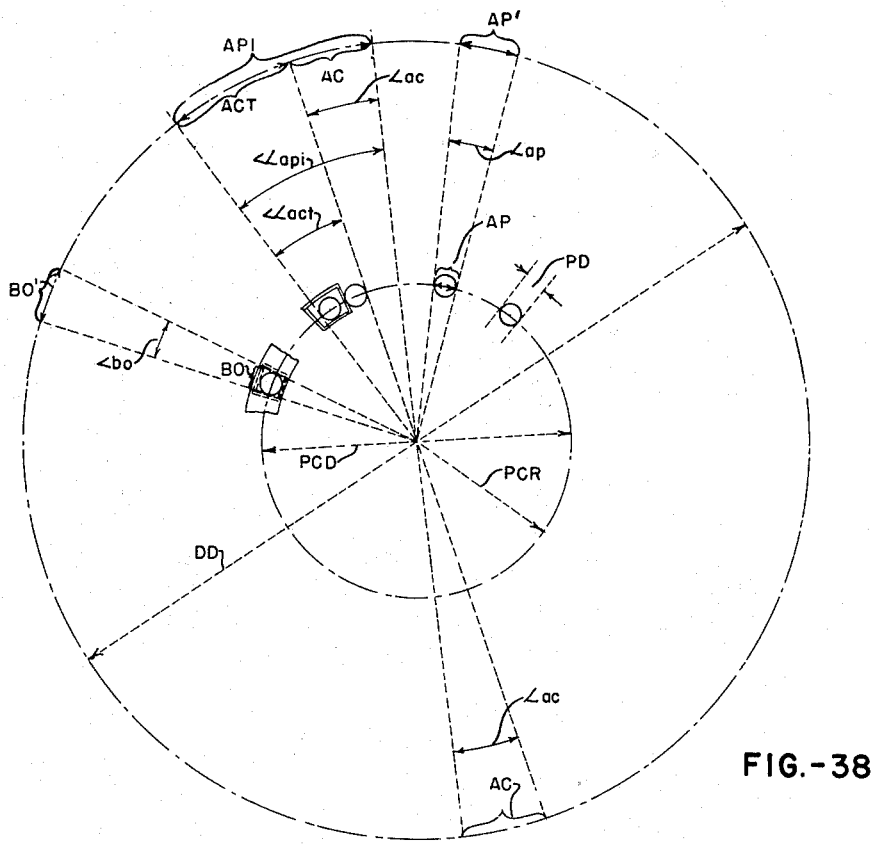
Fig. 38 is a diagrammatic illustration of various arcs and angles pertaining to the structure of a filter.
Figure 39:
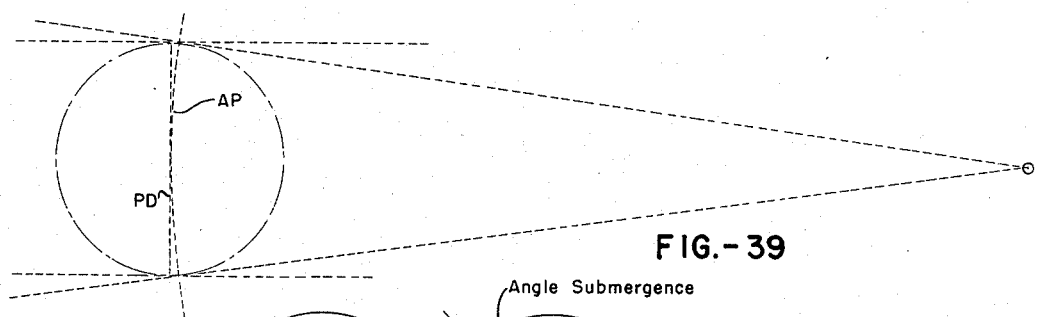
Fig. 39 is a diagrammatic illustration of the arc; AP.
Figure 40:
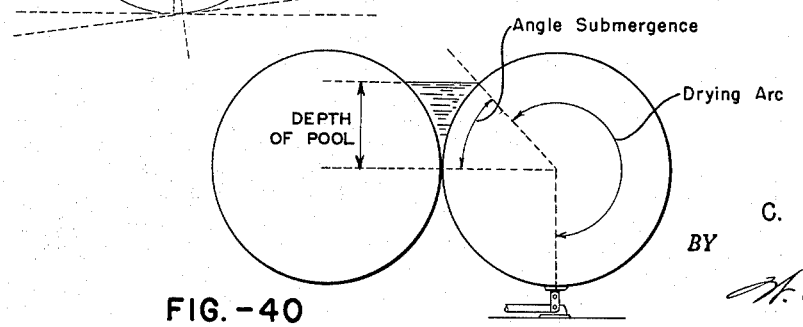
Fig. 40 is a diagrammatic illustration indicating the drying arc and angle of submergence defined in the specification.

Many of the characteristics therein mentioned, and their relationship to each other, can be best demonstrated mathematically. The various symbols utilized in this mathematical explanation are illustrated in Figs. 38-40, inclusive, and are defined as follows:—

Arc AP, the arc subtended at the port circle by two lines drawn from the drum axis tangent to opposite edges of the port.

Angle $ap$, the angle formed by said tangent lines.

Arc BO, the arc subtended at the port circle by two lines drawn from the drum axis tangent to opposite edges of the bridge opening.

Angle $bo$, the angle between the two tangent lines drawn to the edges of the bridge opening. Angle $bo$ is just slightly greater than angle $ap$ for the embodiment shown.

Arc AC, the arc subtended at the drum circumference by two lines drawn from the drum axis through the adjacent partitions defining a compartment.

Angle $ac$, the angle between the two lines through the partitions.

Arc ACT, the arc of compartment travel, the arc at the drum circumference through which a compartment will travel while subjected to the pressure influences transmitted through a single bridge shoe opening. Angle $act$ is equal to angle $bo$ plus angle $ap$.

Arc API, the arc of pressure influence, the total arc affected by the pressure influences transmitted through a single valve bridge opening. Arc API is equal to arc ACT plus arc AC.

Angle $api$, the angle of pressure influence. Angle $api$ is equal to angle $act$ plus angle $ac$ and, since angle $act$ is equal to angle $bo$ plus angle $ap$, angle $api$ is equal to angle $bo$ plus angle $ap$ plus angle $ac$.

With these relationships the per cent of circumference influenced by pressure may be readily determined. For instance, if the angles as set forth above are known, the following formula will be used:

(1)

$API$ as percent of circumference =

$$\frac{(\text{angle } bo + \text{angle } ap + \text{angle } ac)}{360°} \times 100$$

When actual measurements of the angle are impossible, the per cent of circumference influenced by pressure may be calculated through use of the arc measurements. This calculation may be facilitated and made easier by disregarding certain minor errors. For instance, the arc AP will be approximately equal to the port diameter whenever the port circle diameter is of sufficient size. Likewise, the arc BO is approximately equal to the arc AP for the embodiment shown. The following formulas will give the per cent submergence when the lengths of the different arcs are known:

Where arc BO' and arc AP' are the arcs subtended by the angle $bo$ and angle $ap$ at the drum circumference, and DD is the drum diameter then:

(2)

Percent of circumference influenced =

$$\frac{(\text{arc } BO' + \text{arc } AP' + \text{arc } AC)}{\pi DD} \times 100$$

Since arc BO' is by simple proportion equal to $$\text{Arc } BO \times \frac{DD}{PC}$$

and arc AP' is equal to $$\text{Arc } AP \times \frac{DD}{PC}$$

when PC is the diameter of the port circle, then:

(3)

Arc $API$ as percent of circumference =

$$\frac{\left(\text{arc } BO \times \frac{DD}{PC} + AP \times \frac{DD}{PC} + \text{arc } AC\right)}{\pi DD} \times 100$$

Substituting for arc its equivalent, $$\frac{\pi DD}{NC}$$

where NC is equal to the number of compartments, and dividing all of the separate quantities in Formula 3 by $\pi DD$:

(4)

Arc $API$ as percent of circumference =

$$\left(\frac{\text{arc } BO}{\pi PC} + \frac{\text{arc } AP}{\pi PC} + \frac{1}{NC}\right) \times 100$$

It will be found in most conventional filters that a ratio of drum diameter to port circle radius $$\frac{(DD)}{PC}$$

exceeds 4.6 to 1. I prefer to employ a ratio not greater than 3 to 1, and in which the minimum API is not greater than 8 per cent as defined in the foregoing calculations.

From the foregoing, it will be apparent that the minimum API can be obtained by utilizing a very large port circle or in other words by having a very small $$\frac{DD}{PC}$$

ratio. This, however, is not economical, since it results in a very large, unwieldy, and costly valve structure, which is particularly subject to wear and abrasion when incompressible solids of the type to which my filter is best adapted are being treated.

As a more specific example of my preferred structure, I employ approximately forty sections on a drum having a port diameter not greater than two and one-half inches which thus defines a compartment angle of only nine degrees, this being employed where the drum diameter to port circle ratio is not greater than 3 to 1. Under these circumstances my filter can be successfully operated at a submergence of 10 to 12 per cent, which gives a substantially increased drying time and a much shorter port cutoff, and therefore a minimum API.

Since it is desired to maintain a static bed at a predetermined depth, I arrange my valve in such manner that vacuum is applied to the compartment approximately at the time the trailing edge of the compartment is at the level of the top of the static bed. This, of course, allows only a relatively short time in which the cake will be formed on the filter medium, but by proper control of drum speed and vacuum intensity I am able to consistently form on the filter medium a homogeneous cake of uniform thickness which exhibits no tendency to slide or slough from the filter medium and fall into the reservoir. Greater submergence and forming of a thicker cake does not tend towards a more economical operation, since the forming of a thicker cake results either in irregular operation due to the top portions of the cake sliding or falling from the filter medium, or a relatively high per cent moisture left in the cake due to the excessive thickness thereof.

From the foregoing it will be apparent that the filter cake is formed on my filter in a uniform and efficient manner in a minimum amount of time, and it remains on my drum for substantially more than one hundred eighty degrees of revolution, since the level of the reservoir is below the crest of the drums and the scraper is disposed below the drum axis. As a result the cake is subjected to the action of the air and differential pressure in correct amount for the particular thickness of cake for a considerable period of time, thus removing a substantially increased percentage of liquid from the cake.

In the operation of a filter a considerable portion of expense is occasioned in the power consumed by the pumps which exhaust the air permeating the cake and passing into the compartments and through the valving arrangement. These pumps fall into two general categories, the first being the cycloidal type, which will operate more economically to create a vacuum within the range of 1 to 15 inches of mercury while displacing a large volume of air. The second type is the rotary or reciprocating type, which will create vacuums of from 15 to 28 inches of mercury more economically than the cycloidal type, but which is of somewhat limited displacement. Filters are generally designed for either the displacement of large volumes of air at relatively low vacuum, or the displacement of relatively smaller volumes of air under relatively more intense vacuum. Since filters requiring the displacement of large volumes of air under a relatively intense vacuum are costly and inefficient, I prefer to employ pumps of the second type, since we have found their operation in most instances is the most satisfactory. In many cases, however, the porosity of the cake formed on the filter medium is so great as to prevent the economical employment of this type of pump. This permeability, however, I reduce by the proper application of vibrators 119 and 121, which effectively compacts the cake on the filter medium, thus reducing its permeability and actually aiding in freeing the cake of liquid.

It should be noted that this application of vibrators for practical purposes requires the use of a filter medium which is capable of transmitting the vibrations to the cake without high attenuation. A metallic or other rigid filter medium is best adapted for this purpose, although in certain applications a cloth stretched over a metallic screen could be substituted. The latter type of structure is, however, considerably less satisfactory, and furthermore, the cloth will not satisfactorily resist the abrasive action of particles forming the static bed 63.

As previously mentioned, the cake remains on the filter medium until it reaches the scraper device 67 disposed in a "six o'clock" position below the axis of the filter drum. The leading edge 197 of the shoe 196 plows the cake from the drum, allowing it to fall to the conveyors 68. As the compartment 112 passes from under the shoe 196, the corresponding port or opening 95 passes under the cutoff 172 and the solid section of the shoe 151. If desired, the compartment at this point may be subjected to the effects of a pressure greater than atmospheric through the opening 213 in the valve shoe 151 before it re-enters the pool 37, and may at the same time be subjected to the action of sprays 212 to assist in cleaning the filter medium.

It may be found in operation that the pressure exerted by the atmosphere against the shoe 196 is so great as to unnecessarily consume power in rotating the filter drum. Under such circumstances the valve 2—6 is opened slightly, allowing air to bleed through the pipe 104 into the filter compartment, thus at least partially relieving the pressure against the shoe 109. Movement of the weight 203 also serves to vary the effective pressure between the shoe and filter drum.

Ordinarily it would be impractical to dispose the discharge device for a drum filter in a "six o'clock" position, since there is ordinarily a certain amount of filtrate remaining in the compartments or the channels leading to the valve structure which runs by gravity through the filter medium and into the cake when permitted by the position of the discharge. I have found that this disadvantage can be overcome by maintaining an air velocity through the compartments and channels sufficient to atomize the small amount of liquid remaining in the channels or compartments, thus permitting the air to sweep the channels and compartments substantially free of liquid. The velocity at which this phenomenon will occur is known as the terminal velocity of a liquid, which is the velocity at which a falling drop of the liquid will divide itself into two or more smaller drops. In the case of water, this velocity is thirty-two feet per second. In some instances I have found it necessary to exceed this minimum velocity to some degree, particularly when the configuration of the compartments and channels is such as to prevent the stream of air from breaking the liquid into droplets.

Referring specifically to instances wherein my filter is used to separate solids from water, I reduce the cross section of my compartments and conduits to a point where the flow of air therein will exceed a velocity of thirty-two feet per second. If the filtrate is other than water, the cross sectional area should be restricted to a point where the air velocity will exceed the terminal velocity of the liquid as above defined. This provides a satisfactory structure for most types of filtrates except those which are highly viscous, and which necessarily require larger channels to permit an adequate rate of liquid flow therethrough, as for example while the compartment is immersed in the pool 37.

When this situation is encountered, an arrangement of the type illustrated in Fig. 36 is preferable, since both the leading and lagging channels may be employed to conduct the filtrate during the first portion of the cycle. The valve is arranged in such manner as to shut off the larger or lagging channel when most of the filtrate has passed to the valve, thus restricting the flow of air to the leading or smaller channel. Under such circumstances, it is obvious that the necessary minimum velocity can be attained without unduly restricting the flow of liquid.

In most cases for the operation of my filter, the rate at which slurry is fed to the pool 37 should exceed the capacity of the filter, thus necessitating the use of accurate overflow devices. It is well known that the use of valves or other devices which might serve to accurately adjust the rate of feed of a slurry are impractical, since they tend to plug unexpectedly and repeatedly. I therefore make no attempt to control closely the rate of feed to the slurry pool 37 and depend entirely upon my overflow device to maintain the pool at a predetermined level.

If in the course of filter operation the density of the feed decreases, thereby decreasing the percentage of solids in the feed, the capacity of the unit is somewhat reduced, because the ratio of solids materials taken from the pool reservoir in proportion to the relatively constant filtrate removal is decreased. As a result, the level of the pool tends to rise under these circumstances, increasing the submergence. As the submergence increases, the capacity of the filter is also increased, thus compensating automatically for a variation in the feed density. The converse of this is also true, since if the percentage of solids in the feed increases, the level of the reservoir will be lowered, because a somewhat increased quantity of solids will be withdrawn. The reduced level of the pool reduces the pickup time, which of course reduces the quantity of solids taken from the pool and thus compensates for the falling reservoir level.

The many advantages of my method and apparatus have been enumerated in the preceding portion of my specification and it will be obvious that the specific structure or operation described is not in each instance essential to their attainment. It should therefore be understood that the specific words and structure employed are illustrative rather than restrictive, and that the scope of my invention includes the modification of its components except as otherwise defined in the appended claims.

I claim:

1. The method for operating a rotatable drum filter of the type having a pool of slurry confined in contact with the drum surface above a plane through the axis of the drum and below the crest of said drum, the peripheral surface of the drum being divided into a plurality of compartments which includes the steps of rotating the drum for passing the compartments upwardly through the pool, maintaining a substantially static bed of solid particles in the bottom of the pool, and subjecting each compartment to subatmospheric pressure while immersed in the pool only after the trailing edge of each said compartment has passed the predetermined upper level of the static bed.

2. A method for filtering fluent matter which comprises feeding a slurry to be filtered into a confined zone above a pair of rotatably mounted drums arranged in relatively close juxtaposition along a substantially horizontal line including the axis of the drums, rotating the drums in a direction to bring the surface of each drum upwardly past the horizontal line and creating a pressure differential for forcing the liquid portion of the slurry through a filter medium on the surface of one of the drums while the surface is passing through said confined zone, the said pressure differential within the confined zone being created only in the upper portion of said zone whereby the filter cake is formed on the filter medium only when the angle of the surface of the filter medium is less than the angle of repose of the cake.

3. The method for filtering a slurry with a filter of the type including a pair of parallel adjacent drums, at least one of which is a filter drum having its periphery divided into compartments, filter media over the compartments and a valve communicating through channels with the compartments for creating a pressure differential across the filter media at a predetermined time, the filter including upright plates across the drums for confining a pool of slurry above and between the drums and an overflow device for maintaining the level of the pool below the crest of the filter drum which includes the steps of feeding slurry to the pool at a rate exceeding the capacity of the filter, forming a relatively static bed of solid particles from the slurry near the bottom of the pool, maintaining the portion of the pool above the static bed in a turbulent condition, rotating the drums in a direction passing the compartments upwardly through the pool, creating a sub-atmospheric pressure in each compartment only after the compartment has passed through the static bed and while the compartment is immersed in the pool for forming a cake on the filter media, drawing air through the filter cake after emergence from the pool in a volume sufficient to yield a velocity in the channels exceeding the critical velocity of the filtrate, vibrating the cake and the filter medium, and discharging the cake from the filter medium at a point below a horizontal plane through the drum axis.

4. The filtration method which comprises forming a pool of slurry above the plane through the axis of rotation of and between two bodies rotating about substantially parallel axes with one said body containing a plurality of compartments covered by filter media passing upwardly through the pool in closely spaced relation to the other rotary body, subjecting said pool to continuous feed and discharge so as to maintain its level below the crest of said rotary bodies, and subjecting each of said compartments to sub-atmospheric pressure while immersed only after a trailing edge of a given compartment has passed substantially above the lower level of the pool so as to form a static bed of solid particles at the bottom of the pool and a substantially homogeneous filter cake on the drum while the angle of the filter media surface in the pool is less than the angle of repose of the cake.

5. Filtering apparatus comprising a filter drum having a metallic deck about its periphery, rigid filter media enveloping the deck, a plurality of spaced elongated metal members between the deck and said filter media supporting the media at a predetermined distance from and in proximity to the deck, and a plurality of electro-magnetic vibrators mounted at uniform intervals directly on the inner surface of the deck, said vibrators being of the high frequency, low amplitude type so as to transmit vibrations to a cake on the filter media with negligible attenuation.

6. Filtering apparatus comprising a filter drum having a metallic deck about its periphery, rigid filter media enveloping the deck, a plurality of spaced elongated metal members between the deck and said filter media supporting the media at a predetermined distance from and in proximity to the deck, and five electromagnetic vibrators mounted at substantially uniform intervals directly on the inner surface of the deck, said vibrators being of the high frequency, low amplitude type so as to transmit vibrations to a cake on the filter media with negligible attenuation.

7. Filtering apparatus comprising a filter drum mounted for rotation about a horizontal axis and having its peripheral surface divided into a plurality of relatively small, narrow filter compartments, a member having a portion of its surface in close proximity to and spaced from the periphery of the filter drum along a first line generally parallel to and in a horizontal plane with the axis of said drum, end plates extending laterally from the ends of the drum and cooperating with said member and drum for confining a pool of slurry above said first line and below the crest of said drum, means for rotating said filter drum in a direction passing the compartments upwardly through the pool of slurry, rotary valve means for interconnecting the compartments and a source of subatmospheric pressure, and a control member interconnected with the rotary valve and arranged to hold said valve closed as each compartment enters said pool and opens said compartment after the trailing edge thereof has passed a predetermined second line lying above said first line, said second line being within the pool of slurry spaced from and in proximity to said first line so as to form a static bed of separated solids on the pool bottom to seal the space between said drum and said member.

8. Filtering apparatus comprising a pair of drums mounted for rotation about parallel approximately horizontal axes, at least one of said drums being a filter drum having its periphery divided into a plurality of relatively small, narrow filter compartments, the peripheral surface of said drums being in close proximity to and spaced from each other and defining a space along their line of approximate tangency, end plates extending across the ends of said drum for confining a pool of slurry between the drums above the line of approximate tangency and below the crest of the filter drum, means for driving the drums in a direction passing their peripheral surfaces upwardly through the pool of slurry, rotary valve means for interconnecting the compartments and a source of subatmospheric pressure, and a control member interconnected with the rotary valve and arranged to hold said valve closed as each compartment enters said pool and opens said compartment after the trailing edge of said compartment passes a predetermined second line lying above said first line, said second line being within the pool of slurry spaced from and in proximity to said first line so as to form a static bed of separated solids on the pool bottom to seal the space between said drums.

9. Filtering apparatus comprising a pair of drums mounted for rotation about parallel approximately horizontal axes, at least one of said drums being a filter drum having its peripheral surface divided into a plurality of relatively small, narrow filter compartments, the peripheral surfaces of said drum being in close proximity to each other and defining a space along their line of approximate tangency, end plates extending across the ends of the drum for confining a pool of slurry between the drums above the line of approximate tangency, means above the drums for continuously feeding an excess of slurry to agitate the pool, an overflow for excess slurry above the line of approximate tangency and below the level of the filter drum crest for maintaining a substantially constant level in said pool, means for driving the drums in a direction passing their peripheral surfaces upwardly through the pool of slurry, rotary valve means for interconnecting the compartments and a source of subatmospheric pressure, and a control member interconnected with the rotary valve and arranged to hold said valve closed as each compartment enters said pool and opens said compartment after the trailing edge of said compartment passes a predetermined second line lying above said first line, said second line being within the pool of slurry and spaced above said first line a distance substantially equal to the width of said compartments so as to form a static bed of separated solids of substantially the width of said compartments on the pool bottom to seal the space between said drums.

References Cited in the file of this patent

UNITED STATES PATENTS

| | | |
|---|---|---|
| 859,857 | Tracy | July 9, 1907 |
| 958,068 | Arbuckle | May 17, 1910 |
| 1,138,192 | Clarke | May 4, 1915 |
| 1,449,774 | Najarian | Mar. 27, 1923 |
| 1,782,214 | Sheperd | Nov. 18, 1930 |
| 1,817,594 | Wagner et al. | Aug. 4, 1931 |
| 1,859,642 | Woodworth | May 24, 1932 |
| 1,913,660 | Crawford | June 13, 1933 |
| 1,917,818 | Woodworth | July 11, 1933 |
| 1,918,456 | Dodge | July 18, 1933 |
| 2,024,426 | Butler | Dec. 17, 1935 |
| 2,134,703 | Cobb | Nov. 1, 1938 |
| 2,230,307 | Munch | Feb. 4, 1941 |
| 2,312,519 | Berry | Mar. 2, 1943 |
| 2,352,304 | Young | June 27, 1944 |
| 2,352,340 | Oswald | June 27, 1944 |
| 2,362,300 | Nyman | Nov. 7, 1944 |
| 2,489,681 | Smith et al. | Nov. 29, 1949 |
| 2,537,414 | Lindblad | Jan. 9, 1951 |
| 2,602,459 | Peterson | July 8, 1952 |

FOREIGN PATENTS

| | | |
|---|---|---|
| 273,072 | Germany | Apr. 17, 1914 |
| 443,475 | Great Britain | Feb. 28, 1936 |